United States Patent
Chen

(10) Patent No.: US 9,229,134 B2
(45) Date of Patent: Jan. 5, 2016

(54) OPTO-ELECTRONIC APPARATUS WITH METALLIC STRUCTURE

(71) Applicant: Soyuan Technology Co., LTD., Victoria (SC)

(72) Inventor: Kuan-Ren Chen, Tainan (TW)

(73) Assignee: SOYUAN TECHNOLOGY CO., LTD., Victoria (SC)

( * ) Notice: Subject to any disclaimer, the term of this patent is extended or adjusted under 35 U.S.C. 154(b) by 36 days.

(21) Appl. No.: 14/275,842

(22) Filed: May 12, 2014

(65) Prior Publication Data

US 2014/0333981 A1    Nov. 13, 2014

(30) Foreign Application Priority Data

May 13, 2013    (TW) .............................. 102116897 A

(51) Int. Cl.
  *G02F 1/01* (2006.01)
  *G02B 5/30* (2006.01)
  *G02B 1/00* (2006.01)

(52) U.S. Cl.
  CPC ...................................... *G02B 1/002* (2013.01)

(58) Field of Classification Search
  CPC . G02B 5/3058; G02B 2207/101; B82Y 20/00
  USPC .................. 359/245, 484.01, 484.09, 485.05, 359/487.03
  See application file for complete search history.

(56) References Cited

U.S. PATENT DOCUMENTS

| | | | | |
|---|---|---|---|---|
| 7,511,884 B2* | 3/2009 | Flagello | .............. | G03F 7/70566 355/71 |
| 7,619,816 B2* | 11/2009 | Deng | ........................ | G02B 5/18 359/484.01 |
| 7,683,982 B2* | 3/2010 | Cho | ...................... | G02B 5/3058 349/96 |
| 7,755,717 B2* | 7/2010 | Zhang | .................. | G02B 5/3058 349/96 |
| 7,755,718 B2* | 7/2010 | Amako | ................ | G02B 5/1809 349/5 |
| 2011/0043813 A1* | 2/2011 | Yamada | ................. | B82Y 20/00 356/447 |

* cited by examiner

*Primary Examiner* — Tuyen Tra
(74) *Attorney, Agent, or Firm* — CKC & Partners Co., Ltd.

(57) ABSTRACT

An opto-electronic apparatus with a metallic structure is provided, and includes a light-permissible medium and a metallic structure. The metallic structure is disposed inside or over the light-permissible medium, and is formed from arrangement of at least one metallic unit. Each metallic unit includes at least three metallic blocks of which centers of mass define a polygon. After passing through the metallic structure, an electromagnetic wave has a distribution curve of transmittance versus wavelength, wherein the distribution curve has at least one transmittance peak value corresponding to at least one wavelength in a one-to-one manner. The area of the polygon is smaller than or equal to $\lambda^2$, the minimum side length ($d_{min}$) is smaller than or equal to $\lambda$, and an averaged width (W) satisfies the following relationship: $0.01\lambda < W < d_{min}$, in which $\lambda$ represents one of the aforementioned at least one wavelength.

15 Claims, 16 Drawing Sheets

OPTO-ELECTRONIC APPARATUS WITH METALLIC STRUCTURE

RELATED APPLICATIONS

This application claims priority to Taiwan Application Serial Number 102116897, filed May 13, 2013, which is herein incorporated by reference.

BACKGROUND

1. Field of Invention

The present invention relates to an opto-electronic apparatus with a metallic structure. More particularly, the present invention relates to an opto-electronic apparatus with a metallic structure for filtering and/or polarizing an electromagnetic wave.

2. Description of Related Art

Filtering of specific frequency spectrum or polarization is a basic operation on electromagnetic waves. The materials and devices capable of color filtering or polarization provide important functionality in electro-optical systems, and are often critical parts of electro-optical systems for scientific, engineering, industrial, consumer, defense and many other applications. The peak transmission efficiency and the effective narrowing of the transmission spectrum are important factors for these applications.

The materials used by conventional skills are mostly dielectrics capable of interacting with electromagnetic waves such as dye, organic, plastic, etc., and are often in a form of film. Since decades ago, a net of metal wires were found to be capable of filtering waves within microwave frequency range, and recently has been improved up to far infrared.

Recently, it is found by scientists that the transmittance of electromagnetic waves can be enhanced through subwavelength holes in the metal film. Although the intensity of electromagnetic waves transmitted through the holes can be higher than that impinging on the area of the holes, yet the overall transmitted intensity is only a small fraction (e.g., less than 10%) of the incoming electromagnetic waves partially because the total area of the holes is much smaller than the overall area irradiated by the incoming waves.

SUMMARY

Therefore, an object of the present invention is to provide an opto-electronic apparatus with a metallic structure for increasing the transmittance of a specific electromagnetic wave or effectively polarizing or filtering the electromagnetic wave.

According to the aforementioned object, an aspect of the present invention is to provide an opto-electronic apparatus for filtering and/or polarizing an electromagnetic wave. The opto-electronic apparatus includes a light-permissible medium and a metallic structure. The metallic structure is disposed inside or over the light-permissible medium, in which the metallic structure is formed from an arrangement of at least one metallic unit. Each metallic unit includes at least three metallic blocks and an incident plane. Centers of mass of the metallic blocks define a polygon, and the incident plane is located on and among the metallic blocks for receiving the electromagnetic wave including a range wavelength. After passing through the metallic structure, the electromagnetic wave has a distribution curve of transmittance versus wavelength, in which the distribution curve has at least one transmittance peak value corresponding to at least one wavelength in a one-to-one manner, and an area (A) of the polygon is smaller than or equal to $\lambda^2$, and the minimum side length ($d_{min}$) of the polygon is smaller than or equal to $\lambda$, and an averaged width (W) of each of the metallic blocks satisfying the following relationships: $0.01\lambda < W < d_{min}$, where $\lambda$ represents one of the at least one wavelength.

In another embodiment, the averaged width (and a length (L) of each of the metallic blocks satisfy the following relationship: $W < L < 2\lambda$.

In another embodiment, the maximum side length ($d_{max}$) of the polygon is smaller than or equal to $2\lambda$.

In another embodiment, the opto-electronic apparatus further includes at least one auxiliary metallic block disposed inside or over the light-permissible medium, wherein the at least one auxiliary is disposed among the metallic blocks.

In another embodiment, the cross-sectional shape of the auxiliary metallic block facing an incident direction of the electromagnetic wave is a polygon, a circle, an ellipse or a combination thereof.

In another embodiment, a ratio of a cross-sectional area of the auxiliary metallic block facing an incident direction of the electromagnetic wave to an area of the polygon defined by the centers of mass of the metallic blocks is smaller than or equal to 50%.

In another embodiment, the auxiliary metallic block is attached to one of the metallic blocks.

In another embodiment, the metallic unit is a red light filter, a green light filter, a blue light filter, an infrared ray filter or their combination.

In another embodiment, the range wavelength is substantially between 0.1 μm and 12 μm.

In another embodiment, the aforementioned $\lambda$ is corresponding to one of the at least one transmittance peak value, and the one of at least one transmittance peak value is a first transmittance peak value, and the first transmittance peak value is greater than 20%, and a spectrum half width corresponding to between the wavelength of the first transmittance peak value and the wavelength whose transmittance is 70% of the first transmittance peak value is smaller than $2\lambda/3$.

In another embodiment, the aforementioned is corresponding to one of the at least one transmittance peak value, and the one of at least one transmittance peak value is a first transmittance peak value, and the first transmittance peak value is greater than 50%, and a spectrum half width corresponding to between the wavelength of the first transmittance peak value and the wavelength whose transmittance is 70% of the first transmittance peak value is smaller than is $\lambda/2$.

In another embodiment, the number of the at least one metallic unit is greater than one, and the metallic units are tightly adjacent to each other.

In another embodiment, he metallic blocks do not simultaneously contact each other.

In another embodiment, the metallic blocks simultaneously contact each other.

In another embodiment, cross-sectional shapes of the metallic blocks facing an incident direction of the electromagnetic wave are at least one polygon, at least one circle, at least one ellipse or combinations thereof.

With the applications of the aforementioned embodiments, the transmittance of the electromagnetic wave can be increased or the electromagnetic wave can be effectively polarized It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
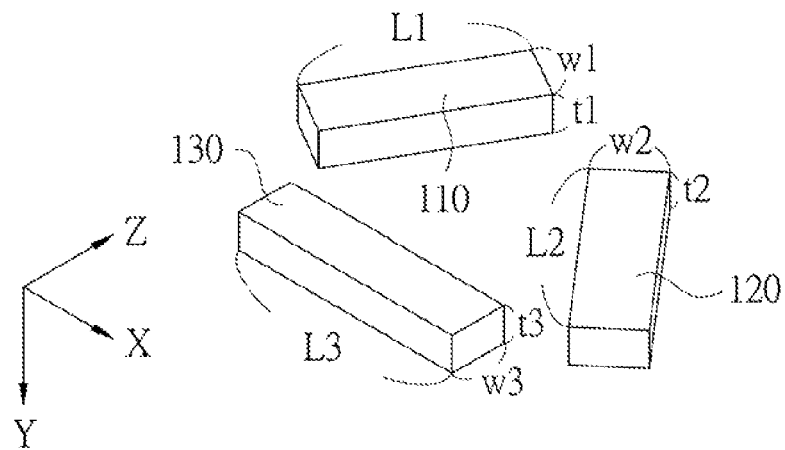
FIG. 1A is schematic 3-D diagram of a metallic structure according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Electrons on the surface of metallic materials can strongly interact with electromagnetic fields, depending on its polarization. In fact, the collective electron motions have plasmonic eigenmodes of which the frequency is proportional to the square root of the electron density that is higher for regular metals and lower for doped semiconductors. A typical plasmonic frequency is in the range from ultraviolet to infrared. The present invention utilizes the aforementioned interaction to achieve good filtering and polarization as well as high transmission efficiency. Electromagnetic force is a long range force, so that the aforementioned interaction does not require a physical contact. Although the multiple metallic blocks or sheets disposed inside or over the light-permissible medium may or may not contact each other, the electrons on one metallic block or sheet can interact with the electromagnetic wave fields which at the same time also interact with the electrons on another block or sheet nearby. These coupled interactions can occur even when there is no physical contact between two blocks/sheets, allowing the surface plasmons to propagate (or the electrons and the electron oscillations to flow) from one block/sheet to another block/sheet. The electric field of the electromagnetic wave has a component (vertically polarized wave) perpendicular to the boundary of the block/sheet, and a component (parallel polarized wave) parallel to the boundary of the block/sheet. These coupled interactions through the electric field can be further enhanced by the polarization effect induced at the boundary surface of the blocks/sheets. The metallic block of the present invention is referred to a square block, a rectangular block or a block in another shape formed from a metallic material. The metallic material is referred to a metal material or a material with partial metallic characters, wherein the metal material can be such as copper, aluminum, alloy, etc., and the material with partial metallic characters can be such as a semiconductor material or a mixture containing the semiconductor material. The light-permissible medium of the present invention can be any light-permissible material, such as air, glass, dielectric, etc.

When the medium (such as the boundary or width of the metallic block) is changed, the electron oscillations will be reflected or partially reflected. The electron oscillations will vigorously interact with the parallel and perpendicular polarized waves, and respectively affect the transmission and reflection of the parallel and perpendicular polarized waves. The geometrical changes of the metallic blocks (such as the changes of respective lengths, widths and thickness thereof) can all affect the electron oscillations and the interactions with the parallel and perpendicular polarized wages of light, and thus affect the transmission, filtering and polarization of light, wherein the interactions can be understood by a finite-difference time-domain (FDTD) simulation.

An opto-electronic apparatus of the present invention includes a light-permissible medium and a metallic structure. The metallic structure is disposed inside or over the light-permissible medium, and is formed from an arrangement of at least one metallic unit. Each metallic unit includes at least three metallic blocks and an incident plane. Centers of mass of the metallic blocks define a polygon, and the incident plane is located on and among the metallic blocks, and the electromagnetic wave is incident to the incident plane. Cross-sectional shapes of the metallic blocks facing an incident direction of the electromagnetic wave may be such as at least one polygon, at least one circle, at least one ellipse or combinations thereof.

After passing through the metallic structure, the electromagnetic wave has a distribution curve of transmittance versus wavelength, in which the distribution curve has at least one transmittance peak value corresponding to at least one wavelength in a one-to-one manner. The metallic structure of the present invention satisfies the following relationships:

$$A \leq \lambda^2 \quad (1)$$

$$d_{min} \leq \lambda \quad (2)$$

$$0.01\lambda < W < d_{min} \quad (3)$$

where

A stands for an area of the polygon;

$d_{min}$ stands for the minimum side length of the polygon; and

W stands for an averaged width of each metallic block.

In some embodiments, the averaged width (W) and a length (L) of each of the metallic blocks satisfy the following relationship:

$$W < L < 2\lambda \quad (4)$$

In some embodiments, the metallic structure of the present invention satisfies the following relationship:

$$d_{max} \leq 2\lambda \quad (5)$$

where $d_{max}$ stands far the maximum side length of the polygon.

It is noted that λ is the electromagnetic wavelength desired to be obtained by using the opto-electronic apparatus of the present invention to perform a filtering operation, such as a red light wavelength, a green light wavelength or a blue light wavelength.

In some embodiments, the opto-electronic apparatus further includes at least one auxiliary metallic block disposed inside or over the light-permissible medium, wherein the at least one auxiliary is disposed among the metallic blocks. A ratio of a cross-sectional area of the auxiliary metallic block facing an incident direction of the electromagnetic wave to an area of the polygon defined by the centers of mass of the metallic blocks is smaller than or equal to 50%. In some embodiments, the auxiliary metallic block is attached to one of the metallic blocks.

On the other hand, the opto-electronic apparatus of the preset invention may be such as a filter, a polarizer, a wave splitter, an image processing device, a sensor or a display, etc. The metallic structure of the present invention is used for filtering (splitter) or polarizing an electromagnetic wave, in which the electromagnetic wave includes a preferable range wavelength which is substantially between 0.1 µm and 12 µm, and more preferably, substantially between 0.1 µm and 2 µm (as shown in the following simulation results). However, the wavelength range of the electromagnetic wave which can be processed by the metallic structure of the present invention is not limited thereto, and may be the wavelength within any range. In some embodiments, the metallic unit of the present invention is a red light filter, a green light filter, a blue light filter an infrared ray filter or their combination.

Hereinafter, several embodiments are illustrated for explaining opto-electronic apparatuses of the present invention, in which metallic blocks forming the metallic structures used in examples corresponding to respective embodiments are formed from Al—Cu alloy, and a light-permissible medium used in each example is air, and the metallic blocks can be fixed on an opto-electronic apparatus by means of an appropriate mechanism. In the following embodiments, same reference numbers shown in the figures represent same or similar elements.

First Embodiment

Figure 1B:
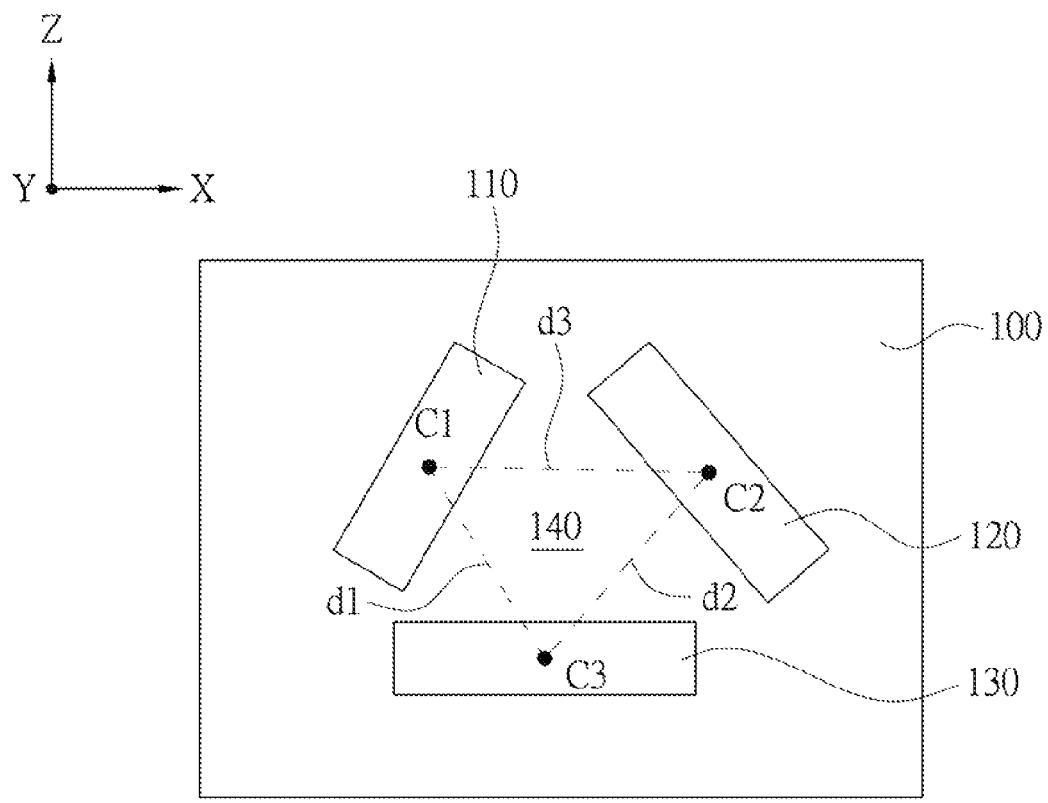
FIG. 1B is a schematic top view of an opto-electronic apparatus according to the first embodiment.

Referring to FIG. 1A and FIG. 1B, FIG. 1A is schematic 3-D diagram of a metallic structure according to a first embodiment of the present invention, and FIG. 1B is a schematic top view of an opto-electronic apparatus according to the first embodiment. The first embodiment is a basic metallic structure of the present invention, and for convenience of explanation, a light-permissible medium 100 is omitted in FIG. 1A. The opto-electronic apparatus of the present invention includes the light-permissible medium 100 and the metallic structure as shown in FIG. 1A. The basic metallic structure of the present invention is formed from three metallic blocks 110, 120 and 130 used for filtering or polarizing an electromagnetic wave. As shown in FIG. 1B the metallic blocks 110, 120 and 130 are disposed inside or over a surface of the light-permissible medium 100, wherein the size of the light-permissible medium 100 is merely used as an example for explanation, and do not intend to limit embodiments of the present invention. In fact, the size of the light-permissible medium 100 may be adjusted in accordance with actual needs. Furthermore, if light-permissible medium 100 fails to provide support to the metallic structure, an appropriate support mechanism is required to be designed additionally, which is well known to those who are skilled in the art and not described herein. As shown in FIG. 1B, the metallic blocks 110, 120 and 130 do not contact each other. However, the metallic blocks 110, 120 and 130 may or may not simultaneously contact each other, and embodiments of the present invention are not limited thereto. A center of mass C1 of the metallic block 110, a center of mass C2 of the metallic block 120 and a center of mass C3 of the metallic block 130 form a triangle 140. The electromagnetic wave is incident on surfaces of the metallic blocks 110, 120 and 130, and among the metallic blocks 110, 120 and 130. In other words, the incident plane is formed on the surfaces of the metallic blocks 110, 120 and 130, and among the metallic blocks 110, 120 and 130.

Figure 1C:
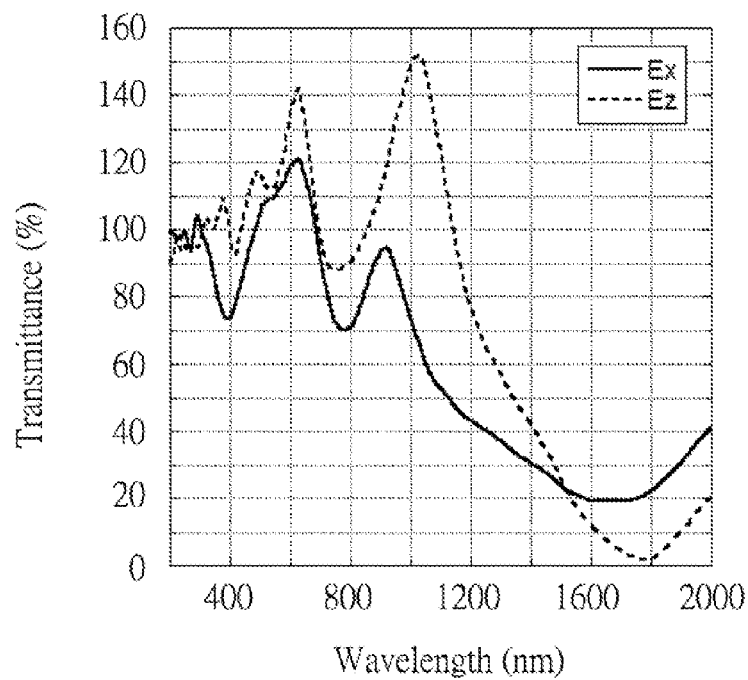
FIG. 1C shows distribution curves of x-axis (Ex) transmittance versus wavelength and z-axis (Ez) transmittance versus wavelength obtained by simulating an application example of the first embodiment.

Referring to FIG. 1C, FIG. 1C shows distribution curves of x-axis (Ex) transmittance versus wavelength and z-axis (Ez) transmittance versus wavelength obtained by simulating an application example of the first embodiment. A transmittance is a ratio of the intensities of the electromagnetic wave before or after entering an area among the metallic blocks 110, 120 and 130 plus areas of the metallic blocks 110, 120 and 130. Since the minimum side length ($d_{min}$) and/or the maximum side length ($d_{max}$) of the polygon may be smaller than $\lambda$, electrons or plasmons on the metallic blocks 110, 120 and 130 are coupled with the electric field of the electromagnetic wave, such that the metallic structure of the present invention has excellent filtering and polarizing effects. The transmittance can be divided into a component (referred as a x-axis transmittance (Ex) as shown in FIG. 1C) passing through an electric field along the x axis (substantially perpendicular to the (latitude and longitude) surface of the metallic blocks 110, 120 and 130), and a component (referred as a z-axis transmittance (Ez), as shown in FIG. 1C) passing through an electric field along the axis (substantially parallel to the (latitude and longitude) surface of the metallic blocks 110, 120 and 130). From the distribution curves of x-axis transmittance versus wavelength and z-axis transmittance versus wavelength, the filtering and polarizing effects of the metallic structure of this embodiment can be known, in which the x-axis transmittance component and the z-axis transmittance component may exhibit the polarizing effect of the metallic structure, and the transmittance at a peak value, a valley value or zero may exhibit the filtering effect. When the transmittance is at a peak value, it means that the electromagnetic wave with a wavelength corresponding to the transmittance can pass through the metallic structure. When the transmittance is at a valley value or zero, it means that the electromagnetic wave with a wavelength corresponding to the transmittance is filtered out by the metallic structure.

In this application example, the length L1 of the metallic block 110 is 600 nm; the width w1 thereof is 200 nm; and the thickness t1 thereof is 100 nm. The length L2 of the metallic block 120 is 680 nm; the width w2 thereof is 200 nm; and the thickness t2 thereof is 100 nm. The length L3 of the metallic block 130 is 730 nm; the width w3 thereof is 200 nm; and the thickness t3 thereof is 100 nm. The centers of mass C1, C2 and C3 of the respective metallic blocks 110, 120 and 130 forming the triangle 140 of which the respective side lengths d1, d2 and d3 are 540 nm 600 nm and 600 nm and the area of the triangle 140 is 152735 nm$^2$, in which the minimum side length ($d_{min}$) of the triangle 140 is 540 nm, and the maximum side length ($d_{max}$) thereof is 660 nm.

As shown by a curve Ex in FIG. 1C, the curve corresponding to the present application example has a plurality of transmittance peak values. At a transmittance peak value of 120%, the wavelength $\lambda$ corresponding thereto is about 600 nm, and thus $\lambda^2$ is equal to 360000 nm$^2$. Therefore, the area of the triangle 140 (52735 nm$^2$)≤$\lambda^2$(360000 nm$^2$); $d_{min}$(540 nm)≤$\lambda$(600 nm); 0.01$\lambda$(6 nm)<W(200 nm)<$d_{min}$; W(200 nm)<L(600 nm, 680 nm, 730 nm)<2$\lambda$(1200 nm); $d_{max}$(660 nm)<2$\lambda$(1200 nm), and thus the metallic structure of this application example satisfies the aforementioned equations (1)-(5). Furthermore, the spectrum half width (600 nm−450 nm=150 nm) corresponding to between the wavelength of the transmittance peak value (120%) and the wavelength whose transmittance is 70% of the transmittance peak value (120%×0.7=84%) is also smaller than 2$\lambda$/3 (400 nm). The spectrum half width (150 nm) corresponding to between the wavelength of the transmittance peak value (120%) and the wavelength whose transmittance is 70% of the first transmittance peak value (84%) is also smaller than $\lambda$/2 (300 nm).

As shown by a curve Ez in FIG. 1C the curve corresponding to the present application example has a plurality of transmittance peak values. At a transmittance peak value of 140%, the wavelength $\lambda$ corresponding thereto is about 600 nm, and thus $\lambda^2$ is equal to 360000 nm$^2$. Thus the metallic structure of this application example satisfies the aforementioned equations (1)-(5). Furthermore, the spectrum half width (600 nm−450 nm=150 nm) corresponding to between the wavelength of the transmittance peak value (140%) and the wavelength whose transmittance is 70% of the transmittance peak value (140%×0.7=98%) is also smaller than 2$\lambda$/3 (400 nm). The spectrum half width (150 nm) corresponding to between the wavelength of the transmittance peak value (140%) and the wavelength whose transmittance is 70% of the first transmittance peak value (98%) is also smaller than $\lambda$/2 (300 nm). From FIG. 1C, it can be known that the optoelectronic apparatus of this application example has good filtering and polarizing effects.

Figure 1D:
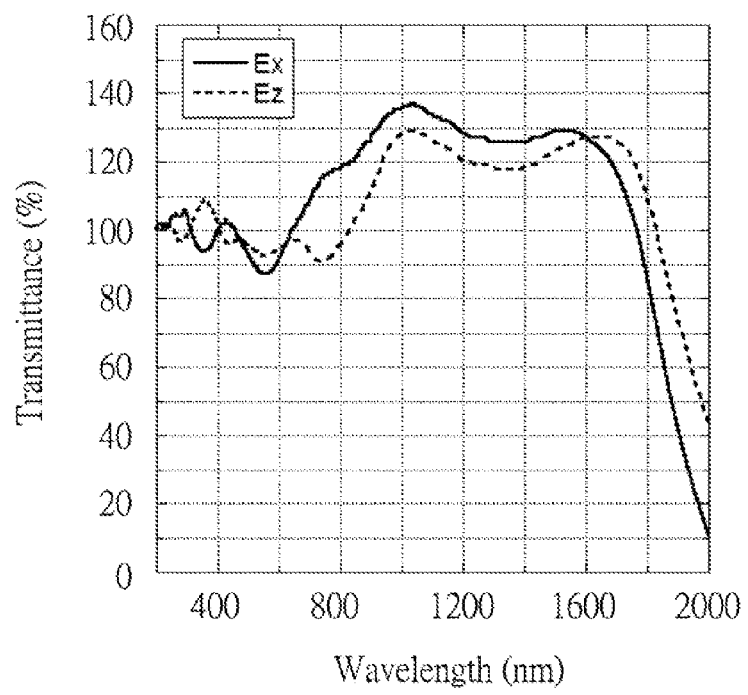
FIG. 1D shows distribution curves of x-axis transmittance (Ex) versus wavelength and z-axis transmittance (Ez) versus wavelength obtained by simulating a comparative example of the first embodiment.

Referring to FIG. 1D, FIG. 1D shows distribution curves of x-axis transmittance (Ex) versus wavelength and z-axis transmittance (Ez) versus wavelength obtained by simulating a comparative example of the first embodiment. The comparative example is different from the application example in that the distances among the center of mass C1 of the metallic block 110, the center of mass C2 of the metallic block 120 and the center of mass C3 of the metallic block 130 are increased. In this comparative example, the centers of mass C1, C2 and C3 of the respective metallic blocks 110, 120 and 130 forming the triangle 140 of which the respective side lengths d1, d2 and d3 are 1200 nm, 1350 nm and 1470 nm, and the area of the triangle 140 is 761744 nm$^2$, in which the minimum side length ($d_{min}$) of the triangle 140 is 1200 nm, and the maximum side length ($d_{max}$) thereof is 1470 nm. The electromagnetic wave is incident on surfaces of the metallic blocks 110, 120 and 130, and among the metallic blocks 110, 120 and 130 along the direction of y-axis.

As shown by a curve Ex in FIG. 1C, the curve corresponding to the present comparative example has a plurality of transmittance peak values. At a transmittance peak value of 130%, the wavelength corresponding thereto is about 1500 nm. However, the spectrum half width corresponding to between the wavelength of the transmittance peak value (130%) and the left-side wavelength whose transmittance is 70% of the transmittance peak value (130%×0.7=91%) cannot be identified from the curve Ex in FIG. 1D. In other words, the metallic structure of this comparative example has poor filtering and polarizing effects. Similarly, as shown by a curve Ez in FIG. 1D, the curve, corresponding to the present comparative example has a plurality of transmittance peak values. At a transmittance peak value of 130%, the wavelength $\lambda$ corresponding thereto is about 1500 nm or 1700 nm. The spectrum half width corresponding to between the wavelength of the transmittance peak value (130%) and the left-side wavelength whose transmittance is 70% of the transmittance peak value (130%×0.7=91%) cannot be identified from the curve Ez in FIG. 1D. In other words, the opto-electronic apparatus of this comparative example has poor filtering and polarizing effects.

Second Embodiment

Figure 2A:
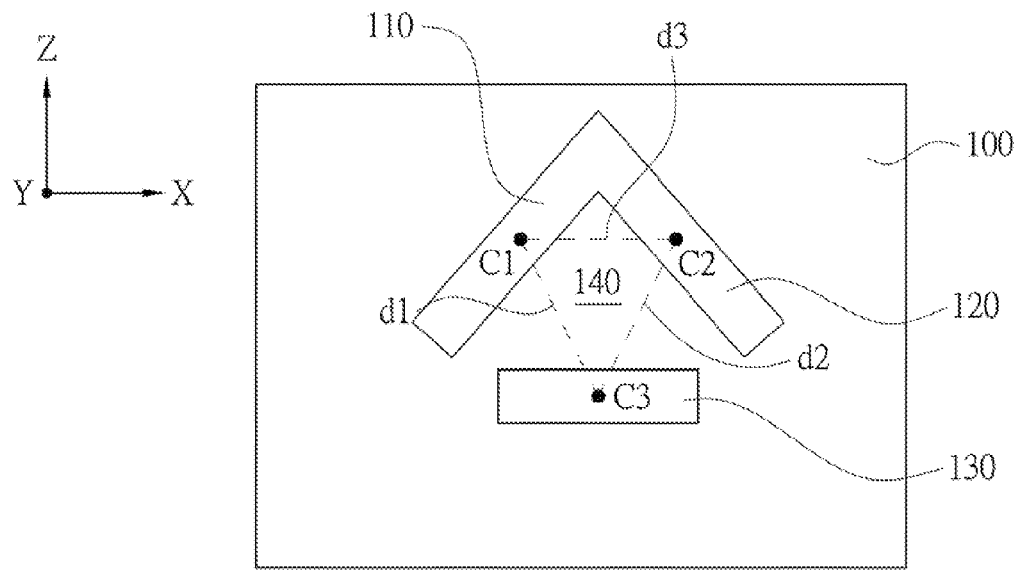
FIG. 2A is a schematic top view of an opto-electronic apparatus according to a second embodiment.

Referring to FIG. 2A, FIG. 2A is a schematic top view of an opto-electronic apparatus according to a second embodiment. The second embodiment is different from the first embodiment in that the metallic block 110 contacts the metallic block 130. In some embodiments, the metallic blocks 110. 120 and 130 may contact each other simultaneously, or one of them contacts the remaining two metallic blocks which do not contact.

Figure 2B:
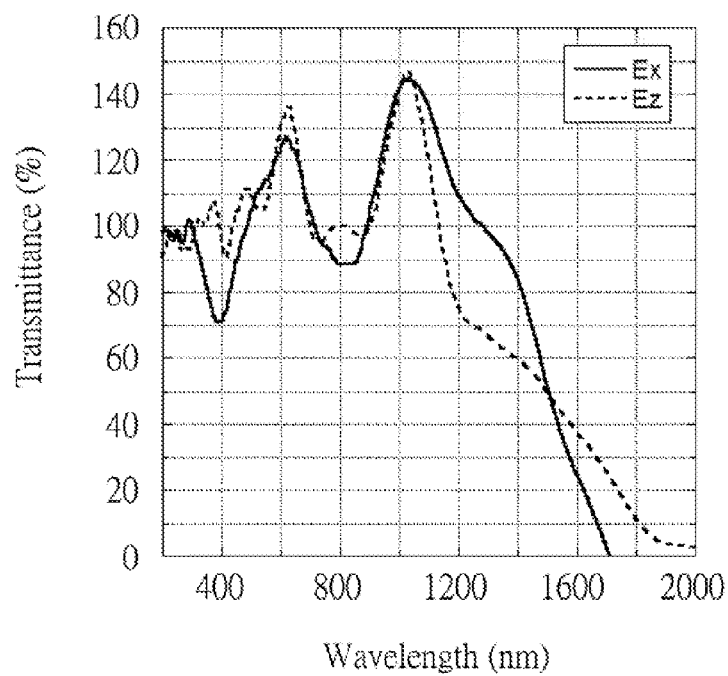
FIG. 2B shows distribution curves of x-axis transmittance (Ex) versus wavelength and z-axis transmittance (Ez) versus wavelength obtained by simulating an application example of the second embodiment.
Figure 3A:
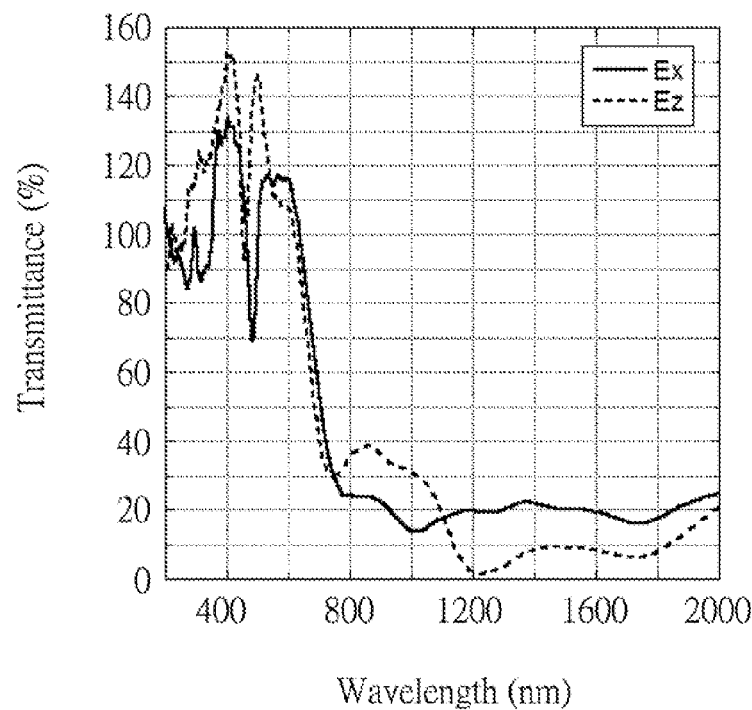
FIG. 3A shows distribution curves of x-axis transmittance (Ex) versus wavelength and z-axis transmittance (Ez) versus wavelength obtained by simulating a first application example of the third embodiment.

Referring to FIG. 2B, FIG. 2B shows distribution curves of x-axis transmittance (Ex) versus wavelength and z-axis transmittance (Ez) versus wavelength obtained by simulating an application example of the second embodiment. The length of the metallic block 110 is 800 nm; the width thereof is 200 nm; and the thickness thereof is 100 nm. The length of the metallic block 120 is 1000 nm; the width thereof is 200 nm: and the thickness thereof is 100 nm. The length of the metallic block 130 is 730 nm: the width thereof is 200 nm; and the thickness thereof is 100 nm. The centers of mass C1, C2 and C3 of the respective metallic blocks 110, 120 and 130 forming the triangle 140 of which the respective side lengths d1, d2 and d3 are 540 nm, 600 nm and 660 nm. The metallic structure of this application example satisfies the aforementioned equations (1)-(5). From FIG. 2B it can be known that the opto-electronic apparatus of this application example has good filtering and polarizing effects, Third Embodiment The third embodiment is different from the first embodiment in that the thickness of each of the metallic blocks 110, 120 and 130 is increased. Referring to FIG. 3A, FIG. 3A shows distribution curves of x-axis transmittance (Ex) versus wavelength and z-axis transmittance (Ez) versus wavelength obtained by simulating a first application example of the third embodiment. In this application example, the thickness of each of the metallic blocks 110, 120 and 130 is 400 nm, and the other sizes and geometrical relationships of the metallic blocks 110, 120 and 130 are the same as those used in the application example of the first embodiment. The metallic structure of this application example satisfies the aforementioned equations (1)-(5). From FIG. 3A, it can be known that the opto-electronic apparatus of this application example has good filtering and polarizing effects.

Figure 3B:
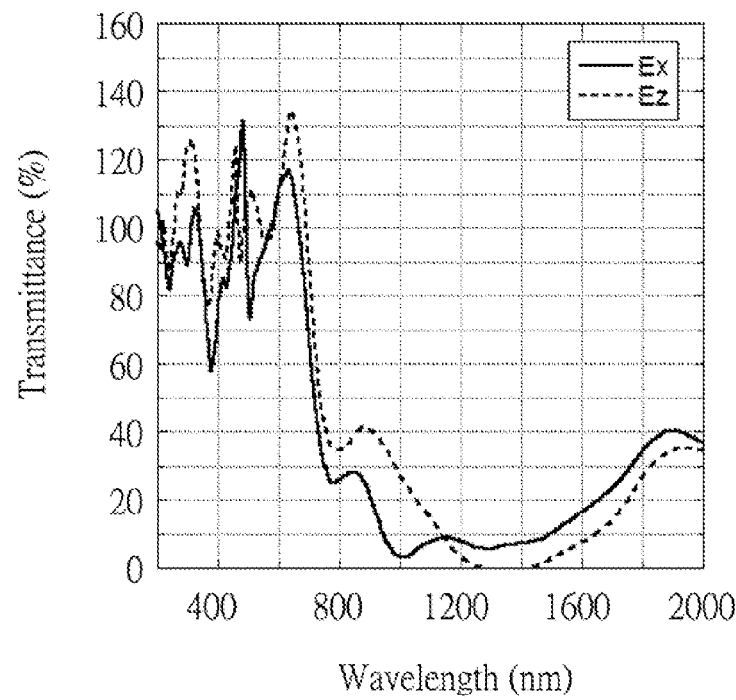
FIG. 3B shows distribution curves of x-axis transmittance (Ex) versus wavelength and z-axis transmittance (Ez) versus wavelength obtained by simulating a second application example of the third embodiment.

Referring to FIG. 3B, FIG. 3B shows distribution curves of x-axis transmittance (Ex) versus wavelength and z-axis transmittance (Ez) versus wavelength obtained by simulating a second application example of the third embodiment. In this application example, the thickness of each of the metallic blocks 110, 120 and 130 is 600 nm, and the other sizes and geometrical relationships of the metallic blocks 110, 120 and 130 are the same as those used in the application example of the first embodiment. The metallic structure of this application example satisfies the aforementioned equations (1)-(5). From FIG. 3B, it can be known that the opto-electronic apparatus of this application example has good filtering and polarizing effects.

Fourth Embodiment

Figure 4A:
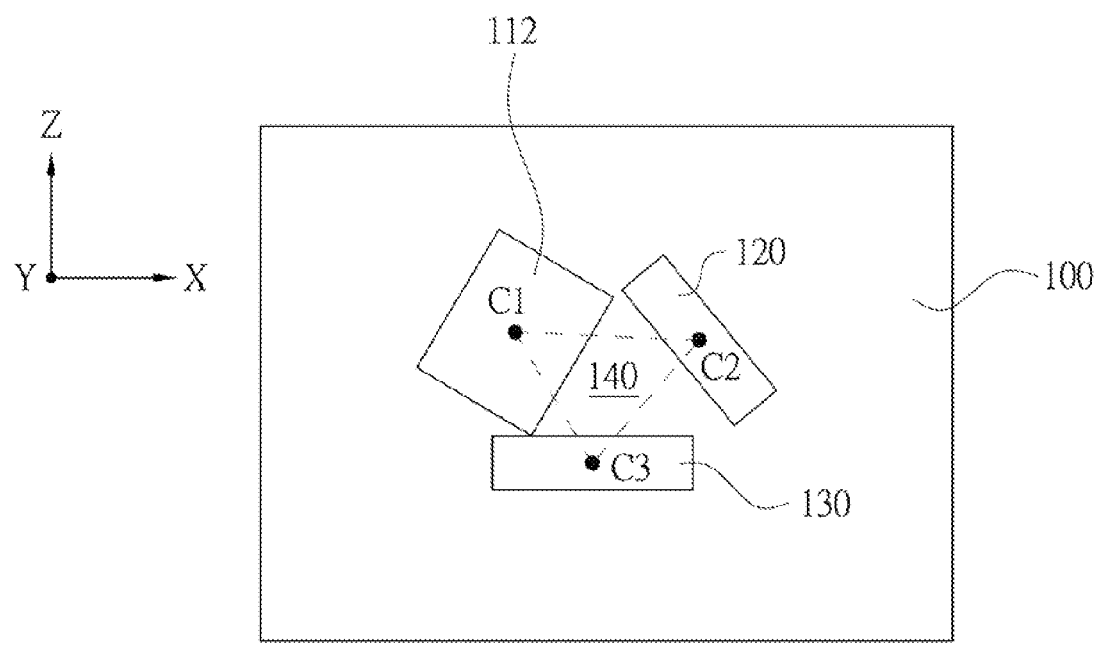
FIG. 4A is a schematic top view of an opto-electronic apparatus according to a fourth embodiment.

Referring to FIG. 4A, FIG. 4A is a schematic top view of an opto-electronic apparatus according to a fourth embodiment. The fourth embodiment is different from the first embodiment in that a wider metallic block 112 replaces the metallic block 110 if the first embodiment.

Figure 4B:
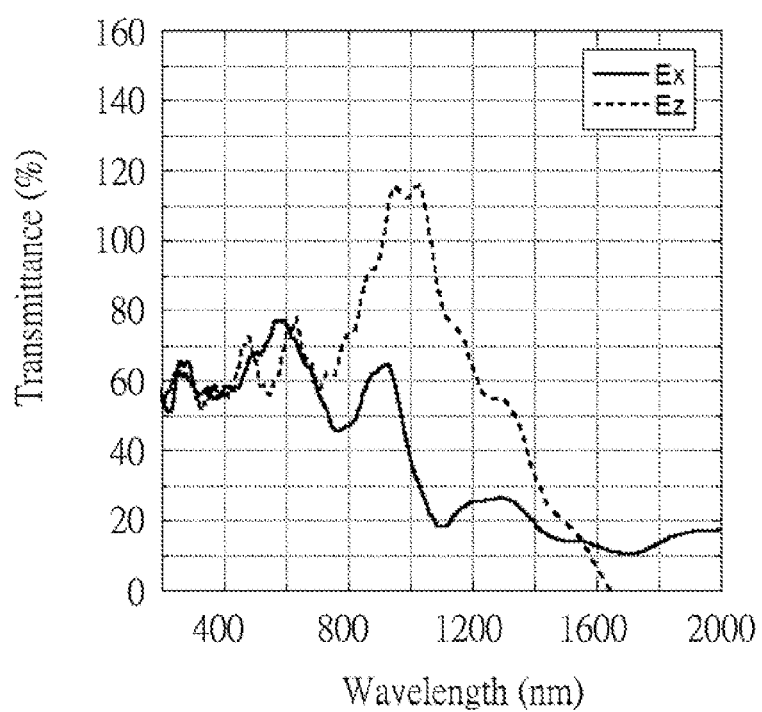
FIG. 4B shows distribution curves of x-axis transmittance (Ex) versus wavelength and z-axis transmittance (Ez) versus wavelength obtained by simulating an application example of the fourth embodiment.

Referring to FIG. 4B, FIG. 4B shows distribution curves of x-axis transmittance (Ex) versus wavelength and z-axis transmittance (Ez) versus wavelength obtained by simulating an application example of the fourth embodiment. In this application example, the width of the metallic block 112 is increased to 500 nm, and the other sizes and geometrical relationships of the metallic blocks 110, 120 and 130 are the same as those used in the application example of the first embodiment. The metallic structure of this application example satisfies the aforementioned equations (1)-(5). From FIG. 4B, it can be known that the opto-electronic apparatus of this application example has good filtering and polarizing effects.

Fifth Embodiment

Figure 5A:
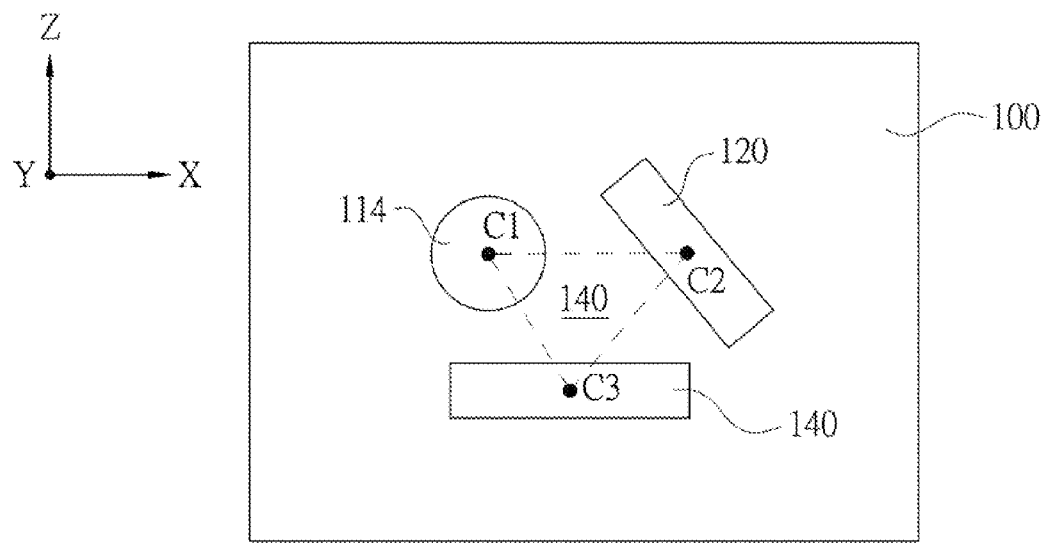
FIG. 5A is a schematic top view of an opto-electronic apparatus according to a fifth embodiment.

Referring to FIG. 5A, FIG. 5A is a schematic top view of an opto-electronic apparatus according to a fifth embodiment. The fifth embodiment is different from the first embodiment in that a metallic circular disk 114 replaces the metallic block 110 of the first embodiment.

Figure 5B:
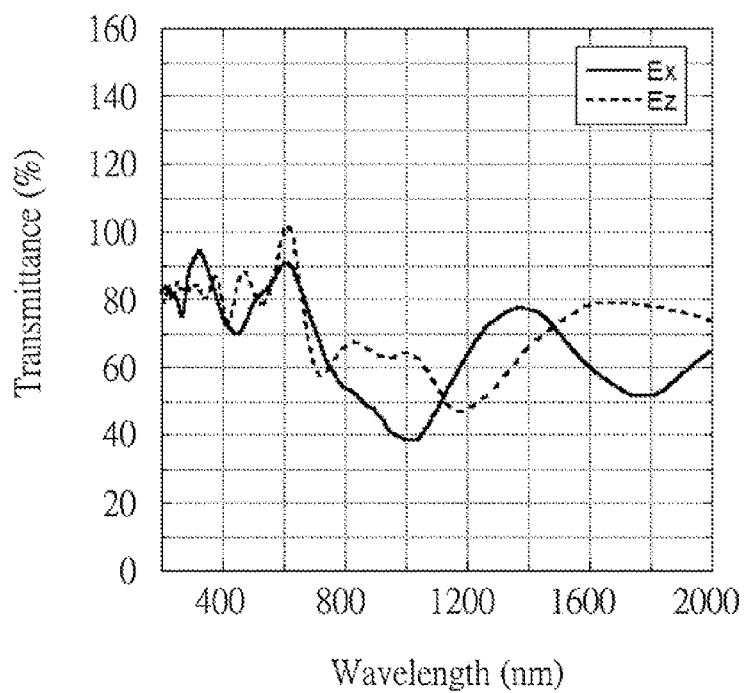
FIG. 5B shows distribution curves of x-axis transmittance (Ex) versus wavelength and z-axis transmittance (Ez) versus wavelength obtained by simulating an application example of the fifth embodiment.

Referring to FIG. 5B, FIG. 5B shows distribution curves of x-axis transmittance (Ex) versus wavelength and z-axis transmittance (Ez) versus wavelength obtained by simulating an application example of the fifth embodiment. In this application example, the radius of the metallic circular disk 114 is 200 nm and the thickness thereof is 100 nm, and the other sizes and geometrical relationships of the metallic blocks 110, 120 and 130 are the same as those used in the application example of the first embodiment. The metallic structure of this application example satisfies the aforementioned equations (1)-(5). From FIG. 5B, it can be known that the opto-electronic apparatus of this application example has good filtering and polarizing effects.

Sixth Embodiment

Figure 6A:
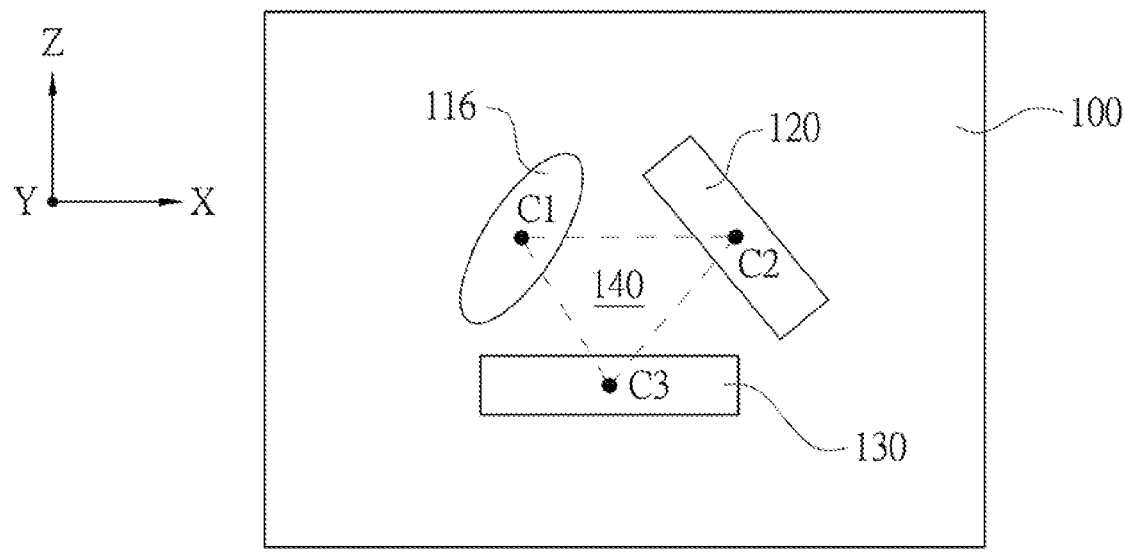
FIG. 6A is a schematic top view of an opto-electronic apparatus according to a sixth embodiment.

Referring to FIG. 6A, FIG. 6A is a schematic top view of an opto-electronic apparatus according to a sixth embodiment. The sixth embodiment is different from the first embodiment in that a metallic elliptical disk 116 replaces the metallic block 110 of the first embodiment.

Figure 6B:
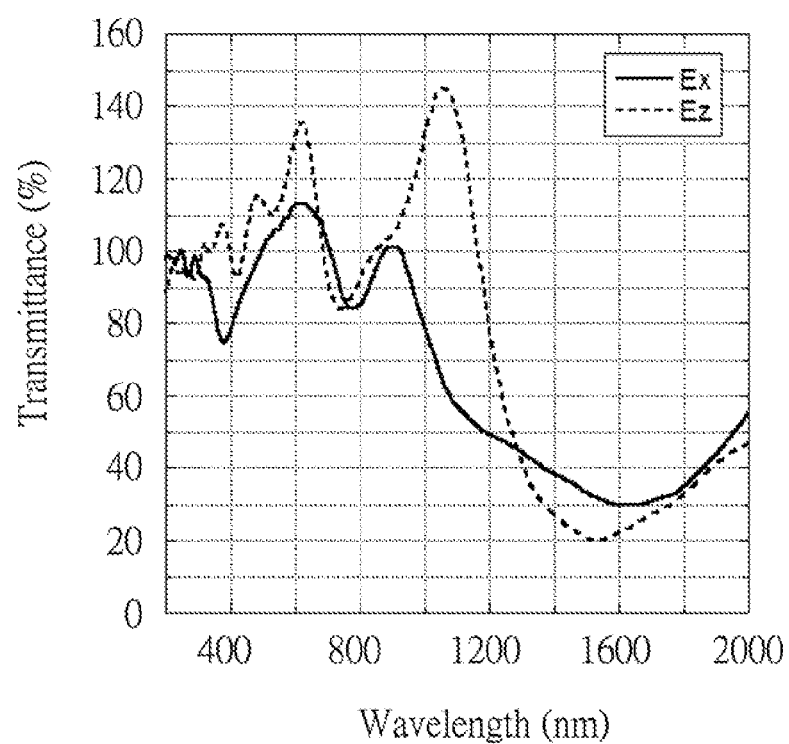
FIG. 6B shows distribution curves of x-axis transmittance (Ex) versus wavelength and z-axis transmittance (Ez) versus wavelength obtained by simulating an application example of the sixth embodiment.

Referring to FIG. 6B, FIG. 6B shows distribution curves of x-axis transmittance (Ex) versus wavelength and z-axis transmittance (Ez) versus wavelength obtained by simulating an application example of the sixth embodiment. In this application example, the longer diameter of the metallic elliptical disk 116 is 600 nm; the shorter diameter thereof is 200 nm; and the thickness thereof is 100 nm, and the other sizes and geometrical relationships of the metallic blocks 110, 120 and 130 are the same as those used in the application example of the first embodiment. The metallic structure of this application example satisfies the aforementioned equations (1)-(5). From FIG. 6B it can be known that the opto-electronic apparatus of this application example has good filtering and polarizing effects.

Seventh Embodiment

Figure 7A:
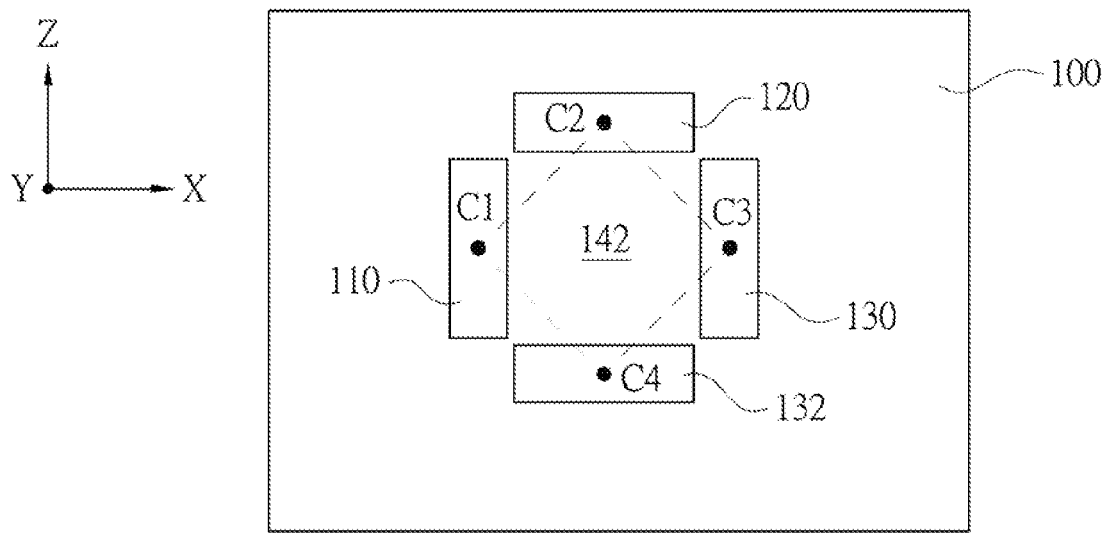
FIG. 7A is a schematic top view of an opto-electronic apparatus according to a seventh embodiment.

Referring to FIG. 7A, FIG. 7A is a schematic top view of an opto-electronic apparatus according to a seventh embodiment. The seventh embodiment is different from the first embodiment in that a metallic block 132 is added, and a center of mass C1 of the metallic block 110, a center of mass C2 of the metallic block 120, a center of mass C3 of the metallic block 130 and a center of mass C4 of the metallic block 132 form a quadrangle 142. Each side length of the quadrangle 142 is 600 nm.

Figure 7B:
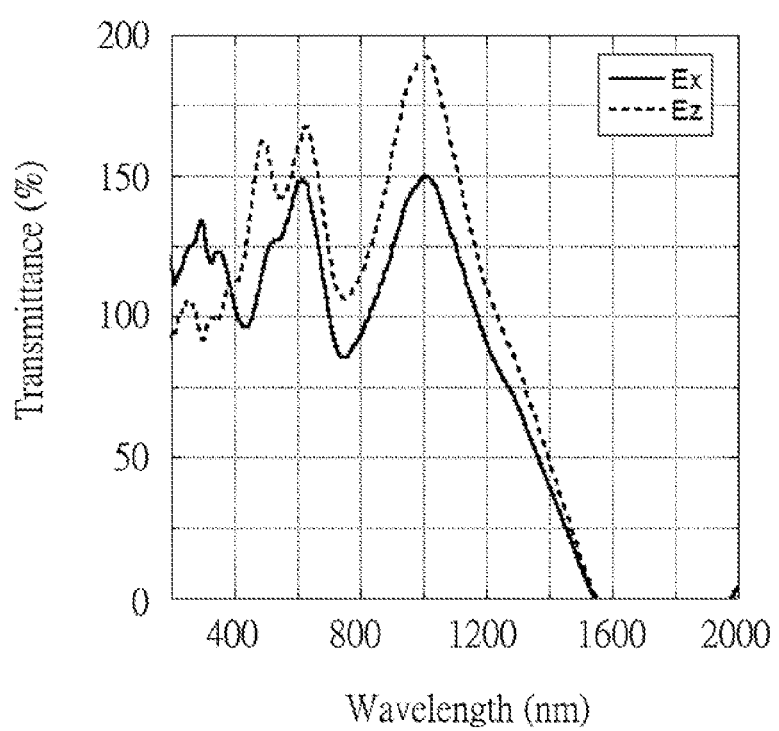
FIG. 7B shows distribution curves of x-axis transmittance (Ex) versus wavelength and z-axis transmittance (Ez) versus wavelength obtained by simulating an application example of the seventh embodiment.

Referring to FIG. 7B, FIG. 7B shows distribution curves of x-axis transmittance (Ex) versus wavelength and z-axis transmittance (Ez) versus wavelength obtained by simulating an application example of the seventh embodiment. In this application example, the length of each of the metallic blocks 110, 120, 130 and 132 is 600 nm; the width thereof is 200 nm; and the thickness thereof is 100 nm, and the side length of the quadrangle 142 is 600 nm. The metallic structure of this application example satisfies the aforementioned equations (1)-(5). From FIG. 7B, it can be known that the opto-electronic apparatus of this application example has good filtering and polarizing effects.

Eighth Embodiment

Figure 8A:
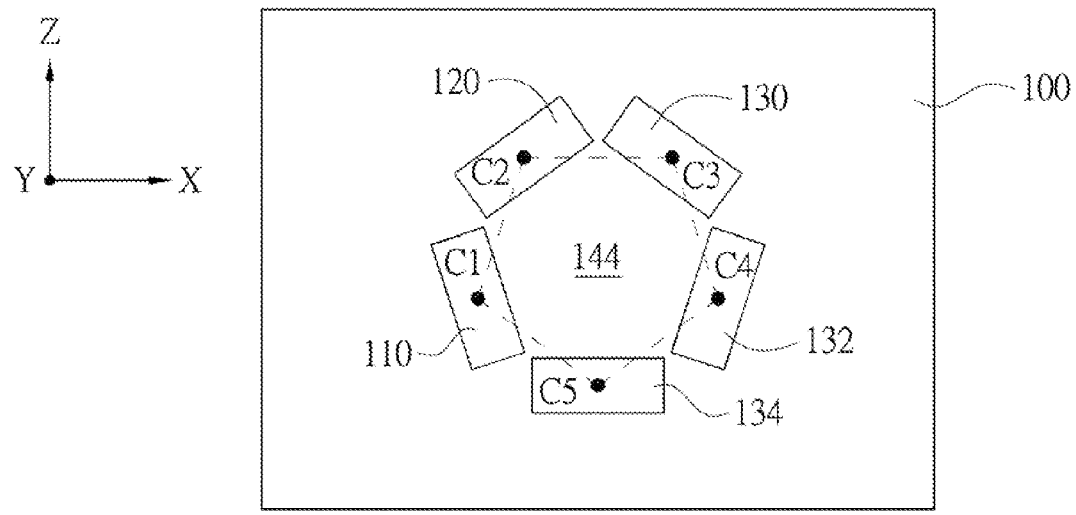
FIG. 8A is a schematic top view of an opto-electronic apparatus according to an eighth embodiment.

Referring to FIG. 8A, FIG. 8A is a schematic top view of an opto-electronic apparatus according to an eighth embodiment. The eighth embodiment is different from the first embodiment in that two metallic blocks 132 and 134 are added, and a center of mass C1 of the metallic block 110, a center of mass C2 of the metallic block 120, a center of mass C3 of the metallic block 130, a center of mass C4 of the metallic block 132 and a center of mass C5 of the metallic block 134 form a pentagon 144. Each side length of the pentagon 144 is 540 nm.

Figure 8B:
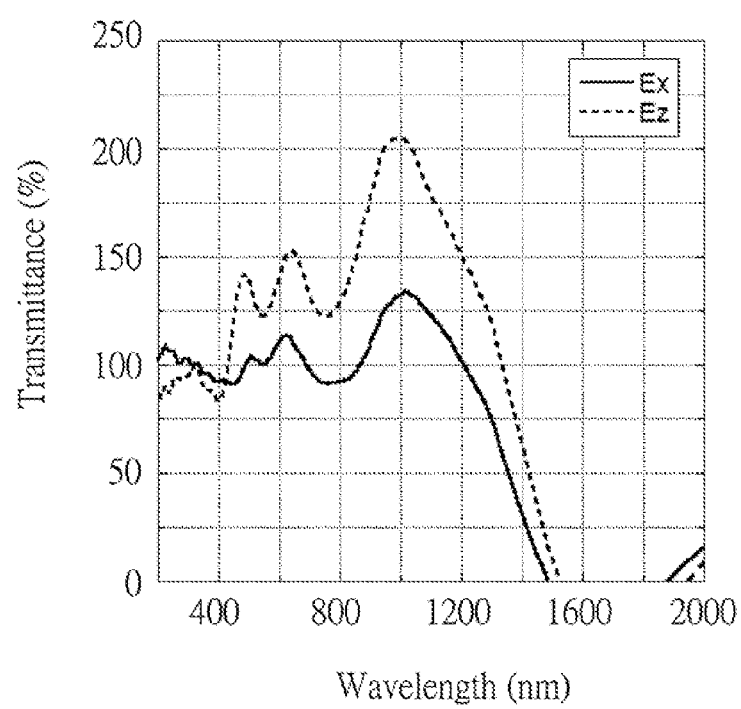
FIG. 8B shows distribution curves of x-axis transmittance (Ex) versus wavelength and z axis transmittance (Ez) versus wavelength obtained by simulating an application example of the eighth embodiment.

Referring to FIG. 8B, FIG. 8B shows distribution curves of x-axis transmittance (Ex) versus wavelength and z-axis transmittance (Ez) versus wavelength obtained by simulating an application example of the eighth embodiment. In this application example, the length of each of the metallic blocks 110, 120, 130, 132 and 134 is 500 nm; the width thereof is 200 nm; and the thickness thereof is 100 nm, and the side length of the quadrangle 142 is 540 nm. The metallic structure of this application example satisfies the aforementioned equations (1)-(5). From FIG. 8B, it can be known that the opto-electronic apparatus of this application example has good filtering and polarizing effects.

Ninth Embodiment

Figure 9A:
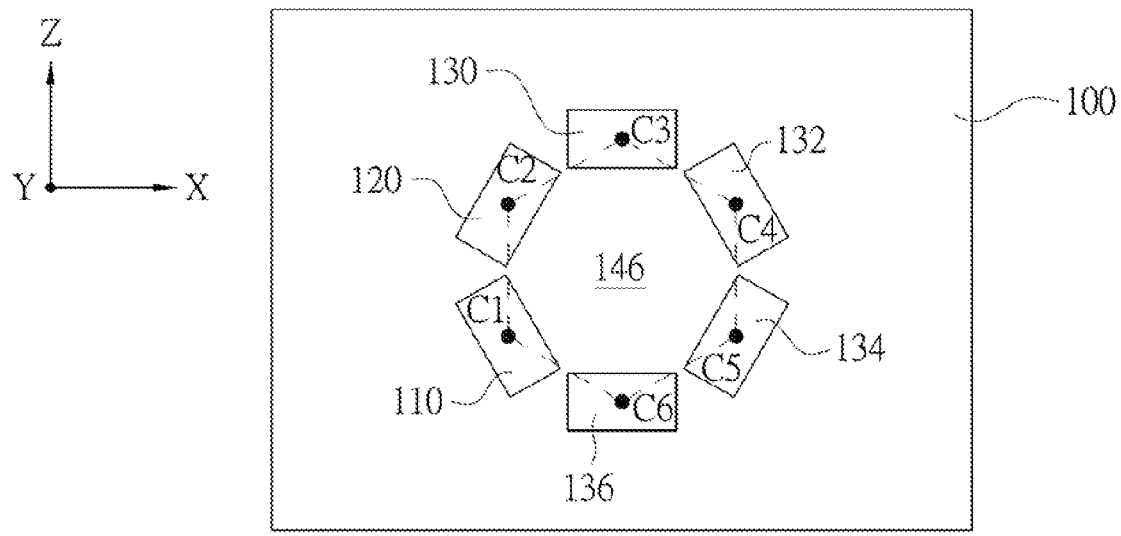
FIG. 9A is a schematic top view of an opto-electronic apparatus according to a ninth embodiment.

Referring to FIG. 9A, FIG. 9A is a schematic top view of an opto-electronic apparatus according to a ninth embodiment. The ninth embodiment is different from the first embodiment in that three metallic blocks 132, 134 and 136 are added, and a center of mass C1 of the metallic block 110, a center of mass C2 of the metallic block 120, a center of mass C3 of the metallic block 130, a center of mass C4 of the metallic block 132, a center of mass C5 of the metallic block 134 and a center of mass C6 of the metallic block 136 form a hexagon 146. Each side length of the hexagon 146 is 540 nm.

Figure 9B:
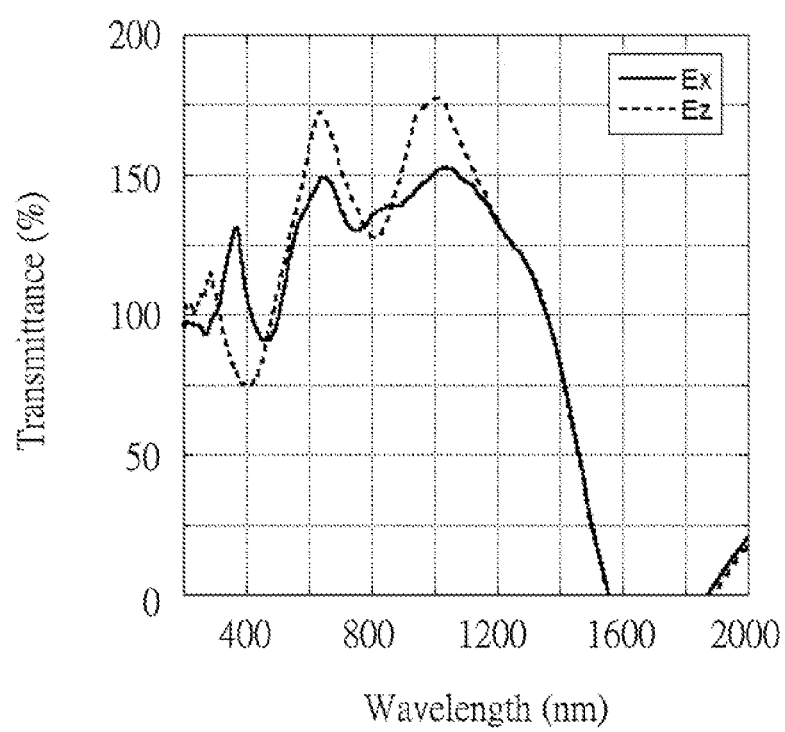
FIG. 9B shows distribution curves of x-axis transmittance (Ex) versus wavelength and z-axis transmittance (Ez) versus wavelength obtained by simulating an application example of the ninth embodiment.

Referring to FIG. 9B, FIG. 9B shows distribution curves of x-axis transmittance (Ex) versus wavelength and z-axis transmittance (Ez) versus wavelength obtained by simulating an application example of the ninth embodiment. In this application example, the length of each of the metallic blocks 110, 120, 130, 132, 134 and 136 is 450 nm; the width thereof is 200 nm; and the thickness thereof is 100 nm, and the side length of the quadrangle 142 is 540 nm. The metallic structure of this application example satisfies the aforementioned equations (1)-(5). From FIG. 9B, it can be known that the opto-electronic apparatus of this application example has good filtering and polarizing effects.

Tenth Embodiment

Figure 10A:
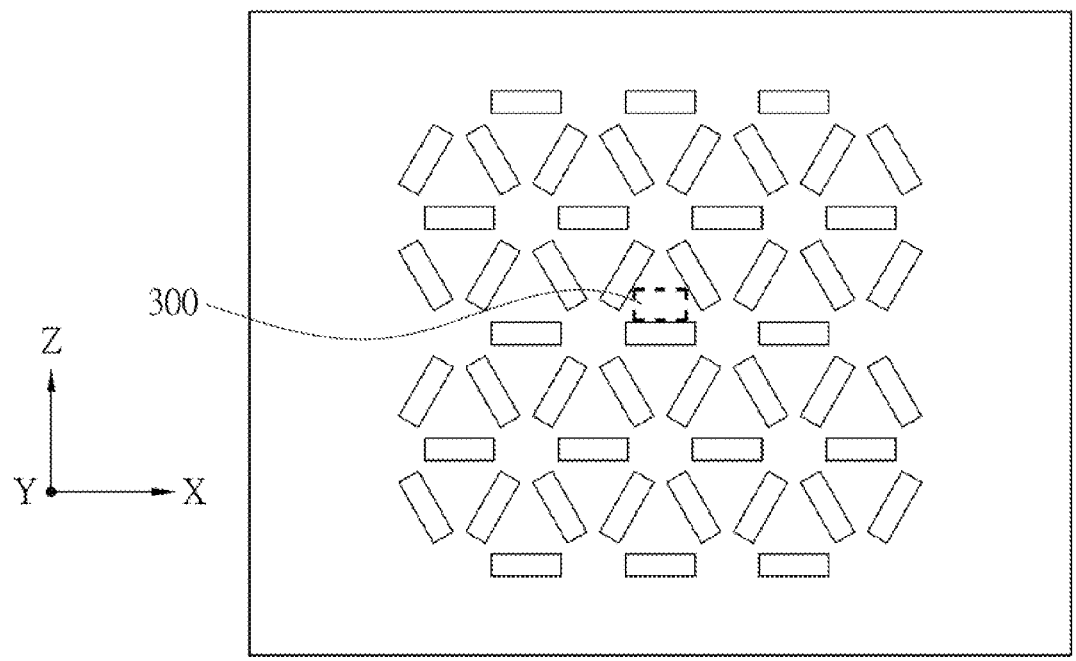
FIG. 10A is a schematic top view of an opto-electronic apparatus according to a tenth embodiment.

Referring to FIG. 10A, FIG. 10A is a schematic top view of an opto-electronic apparatus according to a tenth embodiment. The tenth embodiment is different from the first embodiment in that, the metallic structure of the first embodiment has only one triangular metallic unit, but the metallic structure of the present embodiment is formed from an arrangement of plural triangular metallic units, in which the triangular metallic units are tightly adjacent to each other.

Figure 10B:
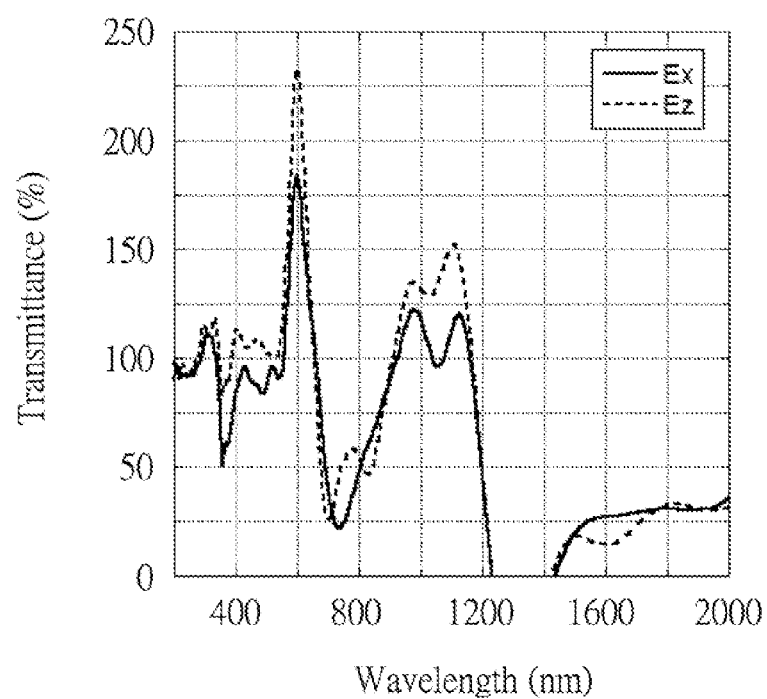
FIG. 10B shows distribution curves of x-axis transmittance (Ex) versus wavelength and z-axis transmittance (Ez) versus wavelength obtained by simulating an application example of the tenth embodiment.

Referring to FIG. 10B, FIG. 10B shows distribution curves of x-axis transmittance (Ex) versus wavelength and z-axis transmittance (Ez) versus wavelength obtained by simulating an application example of the tenth embodiment. In this application example, the size and geometrical relationships of each metallic unit are the same as those used in the application example of the first embodiment, in which a detection range 300 is 280 nm×450 nm. The metallic structure of this application example satisfies the aforementioned equations (1)-(5). From FIG. 10B, it can be known that the opto-electronic apparatus of this application example has good filtering and polarizing effects.

Eleventh Embodiment

Figure 11A:
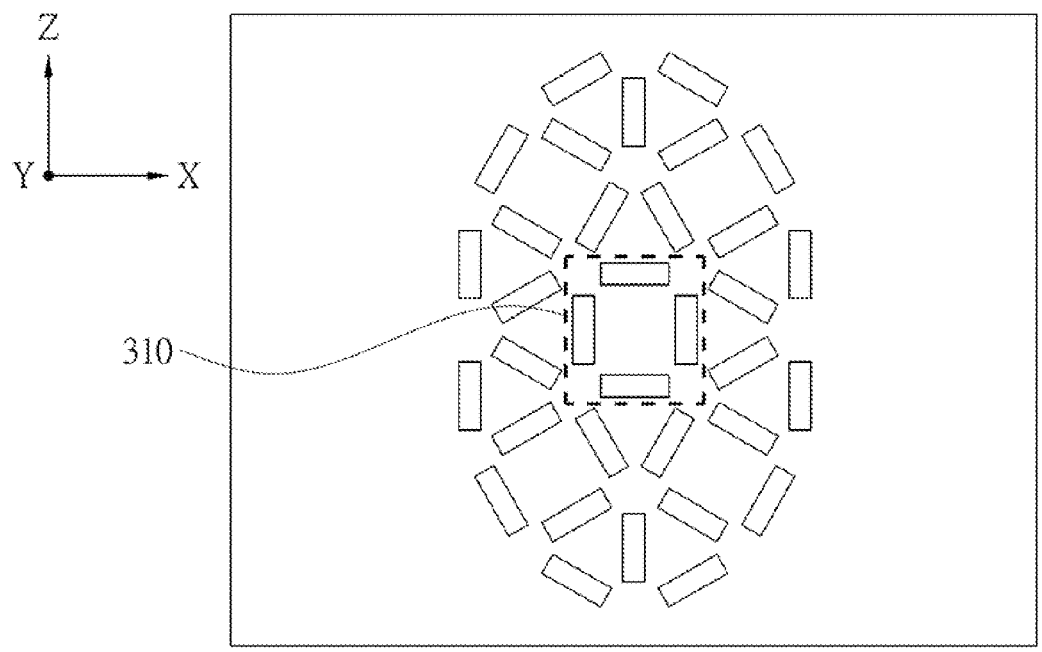
FIG. 11A is a schematic top view of an opto-electronic apparatus according to an eleventh embodiment.

Referring to FIG. 11A, FIG. 11A is a schematic top view of an opto-electronic apparatus according to an eleventh embodiment. The metallic structure of the present embodiment is formed from an arrangement of a quadrangular metallic unit and plural triangular metallic units.

Figure 11B:
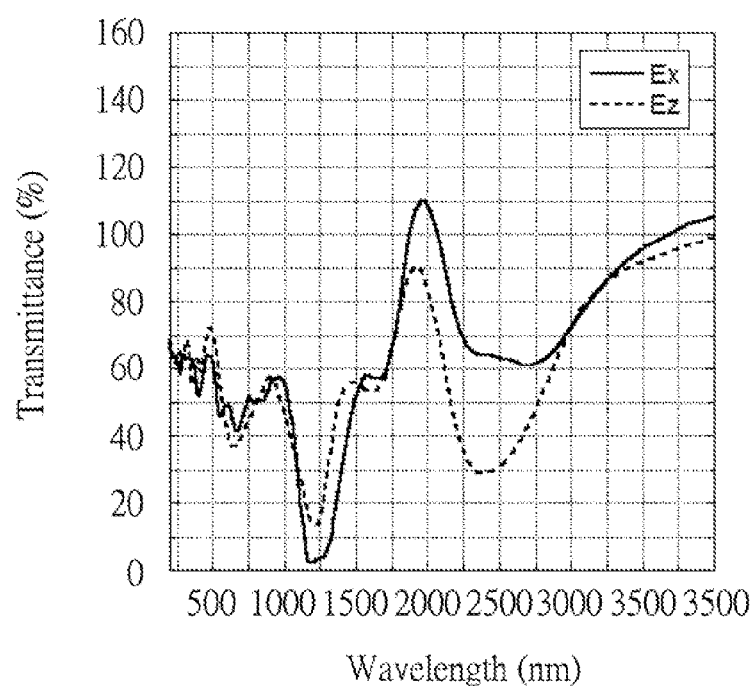
FIG. 11B shows distribution curves of x-axis transmittance (Ex) versus wavelength and z-axis transmittance (Ez) versus wavelength obtained by simulating an application example of the eleventh embodiment.

Referring to FIG. 11B, FIG. 11B shows distribution curves of x-axis transmittance (Ex) versus wavelength and z-axis transmittance (Ez) versus wavelength obtained by simulating an application example of the eleventh embodiment. In this application example, the length of each metallic block is 500 nm; the width thereof is 160 nm; and the thickness thereof is 100 nm, and each side length of the triangle formed from the centers of mass of the metallic blocks is 420 nm, in which a detection range 310 is 1000 nm×1000 nm. The metallic structure of this application example satisfies the aforementioned equations (1)-(5). From FIG. 11B, it can be known that the opto-electronic apparatus of this application example has good filtering and polarizing effects.

Twelfth Embodiment

Figure 12A:
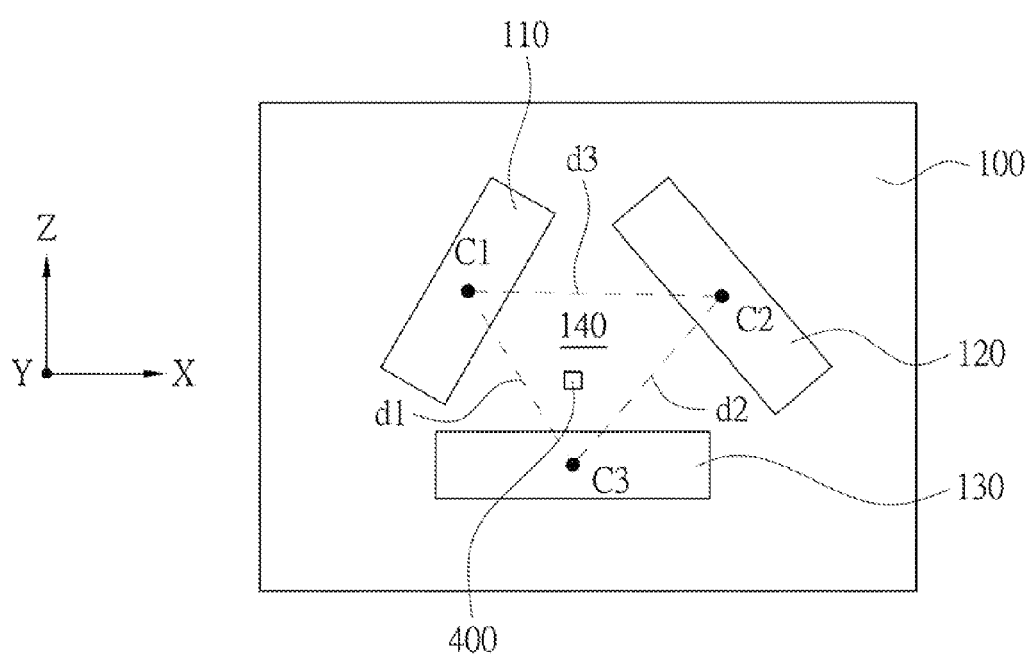
FIG. 12A is a schematic top view of an opto-electronic apparatus according to a twelfth embodiment.

Referring to FIG. 12A, FIG. 12A is a schematic top view of an opto-electronic apparatus according to a twelfth embodiment. The twelfth embodiment is different from the first embodiment in that an auxiliary metallic block 400 is added in the triangular metallic unit. A ratio of a cross-sectional area of the auxiliary metallic block 400 facing an incident direction of the electromagnetic wave to an area of the triangle 140 defined by the centers of mass C1, C2 and C3 of the metallic blocks 110, 120 and 130 is smaller than or equal to 50%. It is worthy to be noted that the number of the auxiliary metallic blocks can be more than two, and the cross-sectional shape of the auxiliary metallic block facing an incident direction of the electromagnetic wave may be a polygon, a circle, an ellipse or a combination thereof.

Figure 12B:
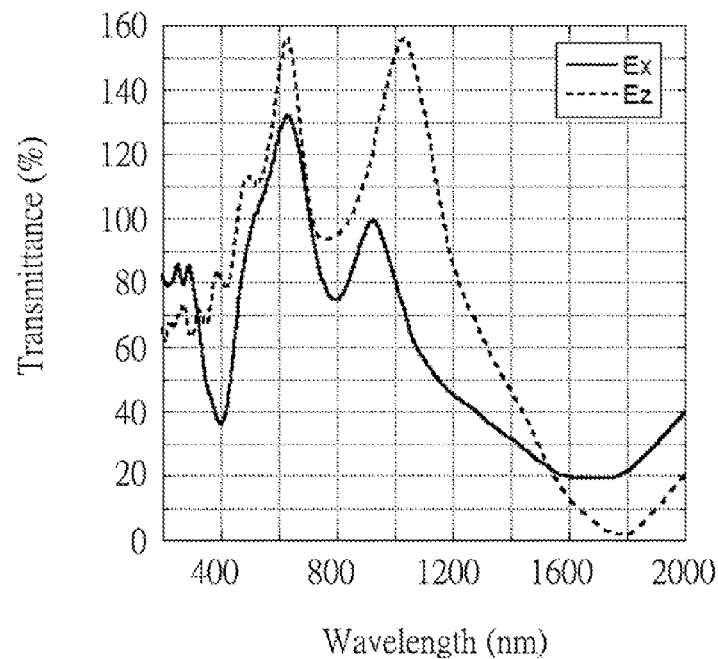
FIG. 12B shows distribution curves of x-axis transmittance (Ex) versus wavelength and z-axis transmittance (Ez) versus wavelength obtained by simulating a first application example of the twelfth embodiment.

Referring to FIG. 12B, FIG. 12B shows distribution curves of x-axis transmittance (Ex) versus wavelength and z-axis transmittance (Ez) versus wavelength obtained by simulating a first application example of the twelfth embodiment. In this application example, the size and geometrical relationships of each metallic unit are the same as those used in the application example of the first embodiment, and the auxiliary metallic block 400 is a metallic cube, and its side length is 100 nm, and the ratio (6.5%) of the cross-sectional area (10000 nm$^2$) of the auxiliary metallic block 400 facing the incident direction of the electromagnetic wave to an area (761744 nm$^2$) of the triangle 140 is smaller than 50%. The metallic structure of this application example satisfies the aforementioned equations (1)-(5). From FIG. 12B, it can be known that the opto-electronic apparatus of this application example has good filtering and polarizing effects.

Figure 12C:
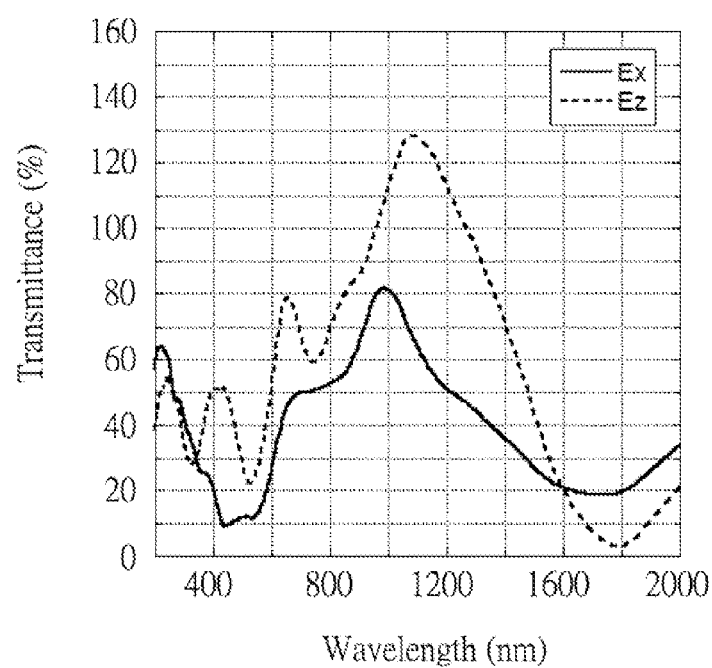
FIG. 12C shows distribution curves of x-axis transmittance (Ex) versus wavelength and z axis transmittance (Ez) versus wavelength obtained by simulating a second application example of the twelfth embodiment.

Referring to FIG. 12C, FIG. 12C shows distribution curves of x-axis transmittance (Ex) versus wavelength and z-axis transmittance (Ez) versus wavelength obtained by simulating a second application example of the twelfth embodiment. In this application example, the size and geometrical relationships of each metallic unit are the same as those used in the application example of the first embodiment, and the auxiliary metallic block 400 is a metallic cube, and its side length is 200 nm, and the ratio (26.2%) of the cross-sectional area (40000 nm$^2$) of the auxiliary metallic block 400 facing the incident direction of the electromagnetic wave to an area (761744 nm$^2$) of the triangle 140 is smaller than 50%. The metallic structure of this application example satisfies the aforementioned equations (1)-(5). From FIG. 12C, it can be known that the opto-electronic apparatus of this application example has good filtering and polarizing effects.

Figure 12D:
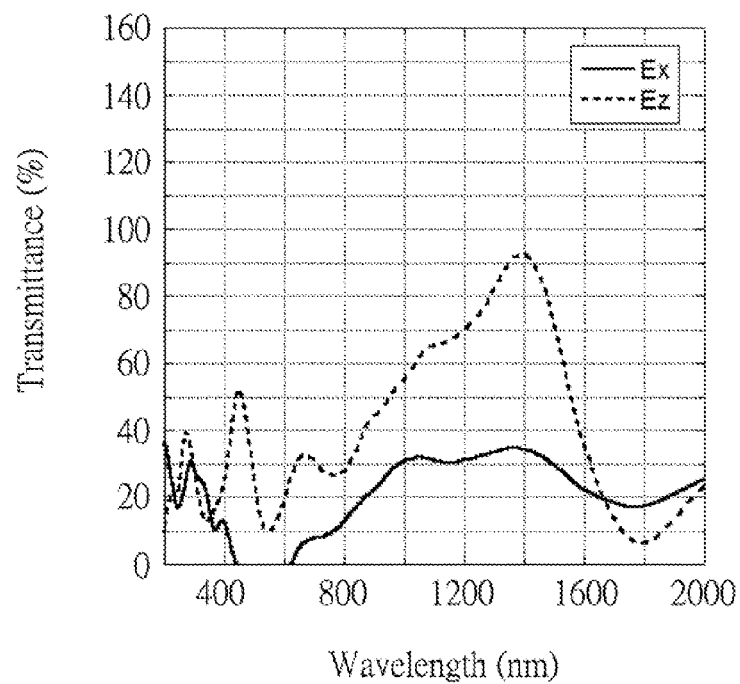
FIG. 12D shows distribution curves of x-axis transmittance (Ex) versus wavelength and z-axis transmittance (Ez) versus wavelength obtained by simulating a third application example of the twelfth embodiment.

Referring to FIG. 12D, FIG. 12D shows distribution curves of x-axis transmittance (Ex) versus wavelength and z-axis transmittance (Ez) versus wavelength obtained by simulating a third application example of the twelfth embodiment. In this application example, the size and geometrical relationships of each metallic unit are the same as those used in the application example of the first embodiment, and the auxiliary metallic block 400 is a metallic cube, and its side length is 250 nm, and the ratio (40.9%) of the cross-sectional area (62500 nm$^2$) of the auxiliary metallic block 400 facing the incident direction of the electromagnetic wave to an area (761744 nm$^2$) of the triangle 140 is smaller than 50%. The metallic structure of this application example satisfies the aforementioned equations (1)-(5). From FIG. 12D, it can be known that the opto-electronic apparatus of this application example has good filtering and polarizing effects.

Figure 12E:
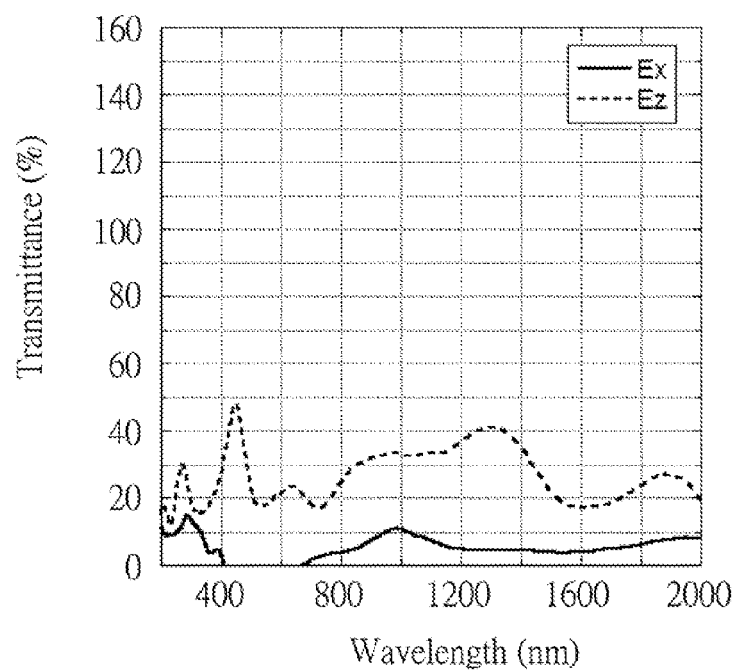
FIG. 12E shows distribution curves of x-axis transmittance (Ex) versus wavelength and z-axis transmittance (Ez) versus wavelength obtained by simulating a fourth application example of the twelfth embodiment.

Referring to FIG. 12E, FIG. 12E shows distribution curves of x-axis transmittance (Ex) versus wavelength and z-axis transmittance (Ez) versus wavelength obtained by simulating a fourth application example of the twelfth embodiment. In this application example, the size and geometrical relationships of each metallic unit are the same as those used in the application example of the first embodiment, and the auxiliary metallic block 400 is a metallic cube, and its side length is 300 nm, and the ratio (58.9%) of the cross-sectional area (90000 nm$^2$) of the auxiliary metallic block 400 facing the incident direction of the electromagnetic wave to an area (761744 nm$^2$) of the triangle 140 is greater than 50%. From FIG. 12E, it can be known that the opto-electronic apparatus of this application example has poor filtering and polarizing effects.

Thirteen Embodiment

Figure 13A:
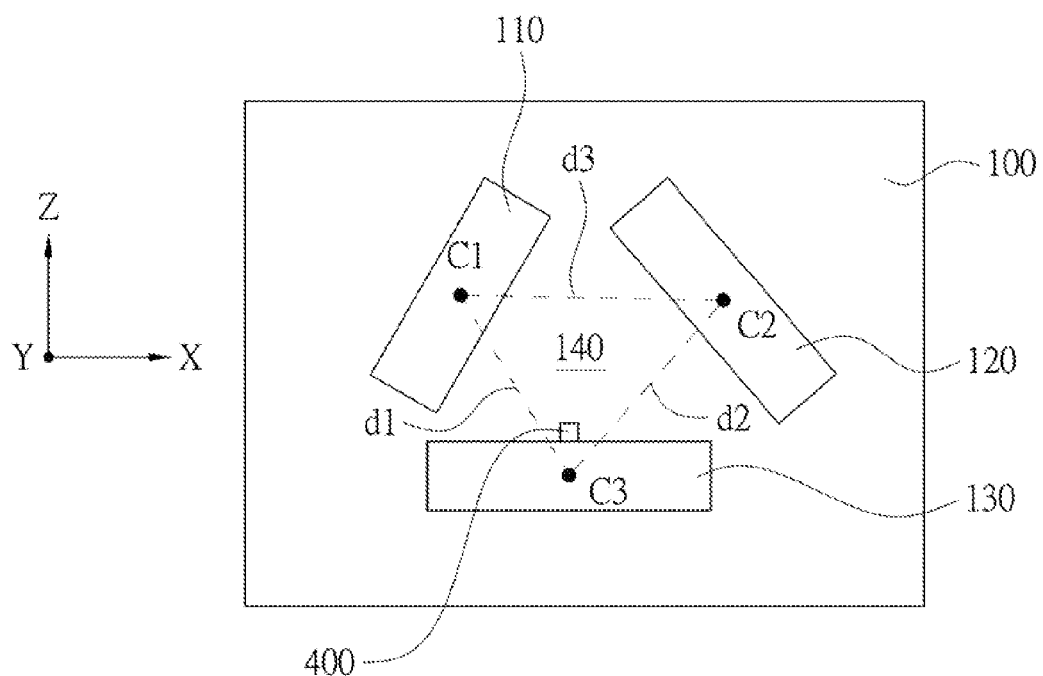
FIG. 13A is a schematic top view of an opto-electronic apparatus according to a thirteenth embodiment.

Referring to FIG. 13A, FIG. 13A is a schematic top view of an opto-electronic apparatus according to a thirteen embodiment. The thirteen embodiment is different from the twelfth embodiment in that the auxiliary metallic block 400 is attached to the metallic block 130. In other embodiments, the auxiliary metallic block 400 also can be attached to the metallic block 110 or 120.

Figure 13B:
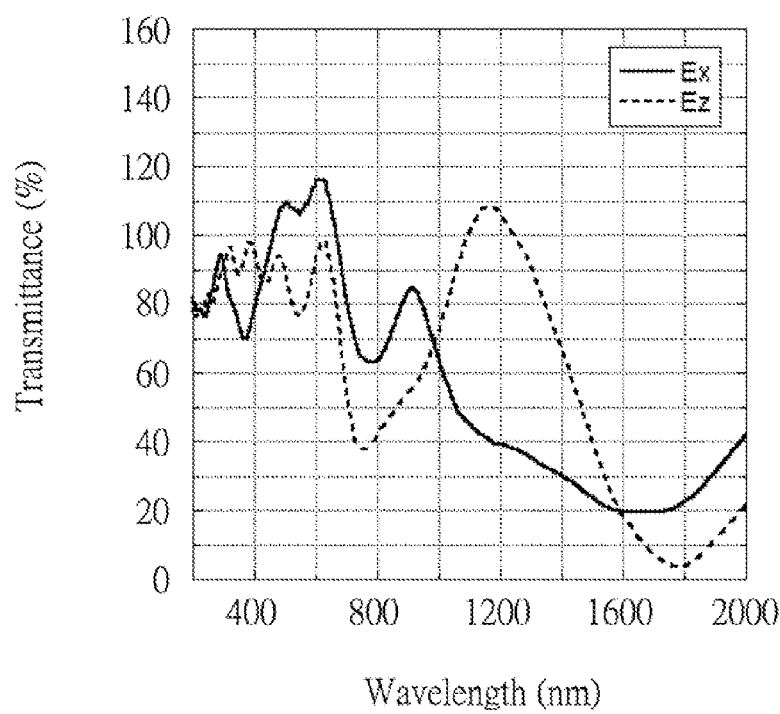
FIG. 13B shows distribution curves of x-axis transmittance (Ex) versus wavelength and z-axis transmittance (Ez) versus wavelength obtained by simulating an application example of the thirteenth embodiment.

Referring to FIG. 13B, FIG. 13B shows distribution curves of x-axis transmittance (Ex) versus wavelength and z-axis transmittance (Ez) versus wavelength obtained by simulating an application example of the thirteen embodiment. In this application example, the sizes of the triangular metallic unit and the auxiliary metallic block 400 are the same as those used in the application example of the twelfth embodiment. The metallic structure of this application example satisfies the aforementioned equations (1)-(5). From FIG. 13B, it can be known that the opto-electronic apparatus of this application example has good filtering and polarizing effects.

It is particularly noted that the aforementioned examples of the respective embodiments are merely used as examples for explanation, and do not intend to limit the present invention. Therefore, the applications of the metallic structures of the present invention are not limited thereto.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An opto-electronic apparatus for filtering and/or polarizing an electromagnetic wave, the opto-electronic apparatus comprising:
   a light-permissible medium; and
   a metallic structure disposed inside or over the light-permissible medium, wherein the metallic structure is formed from an arrangement of at least one metallic unit, each of the at least one metallic unit comprising:
   at least three metallic blocks of which centers of mass define a polygon;
   an incident plane on and among the metallic blocks for receiving the electromagnetic wave comprising a range wavelength, wherein, after passing through the metallic structure, the electromagnetic wave has a distribution curve of transmittance versus wavelength, wherein the distribution curve has at least one transmittance peak value corresponding to at least one wavelength in a one-to-one manner, and an area (A) of the polygon is smaller than or equal to $\lambda^2$, and the minimum side length ($d_{min}$) of the polygon is smaller than or equal to $\lambda$, and an averaged width (W) of each of the metallic blocks satisfying the following relationships: $0.01\lambda<W<d_{min}$, where $\lambda$ represents one of the at least one wavelength.

2. The opto-electronic apparatus as claimed in claim 1, wherein the averaged width (W) and a length (L) of each of the metallic blocks satisfying the following relationship: $W<L<2\lambda$.

3. The opto-electronic apparatus as claimed in claim 1, wherein the maximum side length ($d_{max}$) of the polygon is smaller than or equal to $2\lambda$.

4. The opto-electronic apparatus as claimed in claim 1, further comprising:
   at least one auxiliary metallic block disposed inside or over the light-permissible medium, wherein the at least one auxiliary is disposed among the metallic blocks.

5. The opto-electronic apparatus as claimed in claim 4, wherein at least one cross-sectional shape of the at least one auxiliary metallic block facing an incident direction of the electromagnetic wave is at least one polygon, at least one circle, at least one ellipse or combinations thereof.

6. The opto-electronic apparatus as claimed in claim 4, wherein a ratio of a cross-sectional area of the at least one auxiliary metallic block facing an incident direction of the electromagnetic wave to an area of the polygon defined by the centers of mass of the metallic blocks is smaller than or equal to 50%.

7. The opto-electronic apparatus as claimed in claim 4, wherein the at least one auxiliary metallic block is attached to one of the metallic blocks.

8. The opto-electronic apparatus as claimed in claim 1, wherein the at least one metallic unit is a red light filter, a green light filter, a blue light filter, an infrared ray filter or their combination.

9. The opto-electronic apparatus as claimed in claim 1, wherein the range wavelength is substantially between 0.1 μm and 12 μm.

10. The opto-electronic apparatus as claimed in claim 1, wherein $\lambda$ is corresponding to one of the at least one transmittance peak value, and the one of at least one transmittance peak value is a first transmittance peak value, and the first transmittance peak value is greater than 20%, and a spectrum half width corresponding to between the wavelength of the first transmittance peak value and the wavelength whose transmittance is 70% of the first transmittance peak value is smaller than $2\lambda/3$.

11. The opto-electronic apparatus as claimed in claim 1, wherein $\lambda$ is corresponding to one of the at least one transmittance peak value, and the one of at least one transmittance peak value is a first transmittance peak value, and the first transmittance peak value is greater than 50%, and a spectrum half width corresponding to between the wavelength of the first transmittance peak value and the wavelength whose transmittance is 70% of the first transmittance peak value is smaller than $\lambda/2$.

12. The opto-electronic apparatus as claimed in claim 1, wherein the number of the at least one metallic unit is greater than one, and the metallic units are tightly adjacent to each other.

13. The opto-electronic apparatus as claimed in claim 1, wherein the metallic blocks do not simultaneously contact each other.

14. The opto-electronic apparatus as claimed in claim 1, wherein the metallic blocks simultaneously contact each other.

15. The opto-electronic apparatus as claimed in claim 1, wherein cross-sectional shapes of the metallic blocks facing an incident direction of the electromagnetic wave are at least one polygon, at least one circle, at least one ellipse or combinations thereof.

* * * * *